United States Patent
Takahashi

(10) Patent No.: US 8,335,071 B2
(45) Date of Patent: Dec. 18, 2012

(54) VACUUM CAPACITOR

(75) Inventor: Eiichi Takahashi, Numazu (JP)

(73) Assignee: Meidensha Corporation, Tokyo (JP)

( * ) Notice: Subject to any disclaimer, the term of this patent is extended or adjusted under 35 U.S.C. 154(b) by 288 days.

(21) Appl. No.: 12/743,713

(22) PCT Filed: Nov. 7, 2008

(86) PCT No.: PCT/JP2008/070304
§ 371 (c)(1),
(2), (4) Date: May 19, 2010

(87) PCT Pub. No.: WO2009/066570
PCT Pub. Date: May 28, 2009

(65) Prior Publication Data
US 2010/0254066 A1    Oct. 7, 2010

(30) Foreign Application Priority Data

Nov. 20, 2007   (JP) .................................. 2007-300216

(51) Int. Cl.
*H01G 5/013* (2006.01)
(52) U.S. Cl. ...................................................... 361/279
(58) Field of Classification Search .................... 361/279
See application file for complete search history.

(56) References Cited

U.S. PATENT DOCUMENTS

| | | | | |
|---|---|---|---|---|
| 3,700,983 A | * | 10/1972 | Goetzl | 361/279 |
| 4,007,406 A | * | 2/1977 | Weisbrod | 361/279 |
| 4,177,495 A | * | 12/1979 | Perret | 361/279 |
| 6,268,995 B1 | * | 7/2001 | Beuerman et al. | 361/277 |
| 6,462,930 B1 | * | 10/2002 | Nemoto et al. | 361/279 |
| 6,473,289 B1 | * | 10/2002 | Weisse et al. | 361/283.1 |
| 6,587,328 B2 | * | 7/2003 | Bigler et al. | 361/326 |
| 6,975,499 B2 | * | 12/2005 | Takahashi et al. | 361/277 |
| 7,041,930 B2 | * | 5/2006 | Takahashi et al. | 218/135 |
| 7,242,570 B2 | | 7/2007 | Takahashi | |
| 2006/0266739 A1 | | 11/2006 | Takahashi | |

FOREIGN PATENT DOCUMENTS

| | | |
|---|---|---|
| JP | 06-196363 A | 7/1994 |
| JP | 2001-167695 A | 6/2001 |
| JP | 3264005 A | 12/2001 |
| JP | 2006-332485 A | 12/2006 |

* cited by examiner

Primary Examiner — Eric Thomas
(74) Attorney, Agent, or Firm — Foley & Lardner LLP

(57) ABSTRACT

At least one of the conductive members has a hollow storage portion that is formed at the conductive member and a communication hole through which the storage portion and the vacuum chamber communicate with each other, a getter is set inside the storage portion, and an adsorbed object such as metal particles and gas in a vacuum chamber is adsorbed by the getter. By prevent application of the electric field to the getter, even though the electric field appears in a vacuum casing, a temperature of the getter does not reach a re-release temperature, and also electron stimulus desorption phenomenon does not occur, then it is possible to prevent the metal particles and the gas etc. which have been adsorbed once by the getter from being released.

6 Claims, 6 Drawing Sheets

VACUUM CAPACITOR

TECHNICAL FIELD

The present invention relates to a vacuum capacitor used for an oscillation circuit of a large power oscillator and a high-frequency power supply circuit of a semiconductor manufacturing system etc., and particularly to a vacuum capacitor having a getter mounted inside the vacuum capacitor.

BACKGROUND ART

Conventionally, various vacuum capacitors (for example, Patent Document 1) have been used for impedance adjustment in the high-frequency power supply for normally used semiconductor facilities and a high-frequency apparatus of the large power oscillation circuit etc.

FIG. 6 is a schematic view for explaining an example of a typical vacuum capacitor. In FIG. 6, a reference sign 1 is a vacuum casing. The vacuum casing 1 is formed mainly from a tubular insulation member (e.g. a member made of ceramic material; hereinafter called an insulation tube) 2 and conductive members (e.g. members made of metal such as copper) 3, 4 which are provided on one end side and the other end side of the insulation tube 2.

As can be seen from the drawing, for instance, the conductive members 3, 4 are formed from metal cylinders 5, 6 which are provided on the one end side and the other end side of the insulation tube 2 and flanges (flanges on a movable electrode side and a fixed electrode side; hereinafter called a movable side flange and a fixed side flange) 7, 8 which are provided to close the insulation tube 2 and the metal cylinders 5, 6. The movable side flange 7 and the fixed side flange 8 could also be used as external terminals.

A reference sign 9 is a fixed electrode that is formed from a plurality of cylindrical electrode members whose inside diameters are different from each other. Each electrode member is provided concentrically on an inner side of the fixed side flange 8 (inside the vacuum casing 1) at a predetermined distance. A reference sign 10 is a movable electrode that is formed from a plurality of cylindrical electrode members whose inside diameters are different from each other, same as the fixed electrode 9. Each electrode member is provided concentrically at a certain distance. The movable electrode 10 is provided inside the vacuum casing 1 so that the each electrode member of the movable electrode 10 can be inserted into and extracted from a gap between the electrode members of the fixed electrode 9 with the each electrode member of the movable electrode 10 in noncontact with the electrode members of the fixed electrode 9. A reference sign 11 is a movable conductor. The movable conductor 11 is formed from a movable electrode supporting member 12 that supports the movable electrode 10 and a movable rod 13 that protrudes from a back surface (a surface on which the movable electrode 10 is not secured) of the movable electrode supporting member 12.

A reference sign 14 is bellows that are made of soft metal having elasticity (e.g. a member made of phosphor bronze or a member formed from a copper-clad SUS member), as a part of current path of the vacuum capacitor. One side edge of the bellows 14 is connected with a bearing portion 15 (by brazing) and the other side edge of the bellows 14 is connected with the movable conductor 11 (by brazing) so that the movable conductor 11 (the movable electrode 10) can be raised and lowered in an axial direction while a vacuum chamber 18 enclosed by the fixed electrode 9, the movable electrode 10 and the bellows 14 inside the vacuum capacitor being kept airtight.

With regard to the movable rod 13, for instance, a columnar member is used for the movable rod 13. And as mentioned above, the movable electrode 10 is fixed to one end side of the movable rod 13, and the other end side of the movable rod 13 is movably supported by the bearing portion 15 provided in the movable side conductive member 4. As a support structure of the movable conductor 11, such a structure that the other end side of the movable conductor 11 is screwed into a member which is rotatably supported by the bearing portion 15, could be employed. As an example, such a structure that a male screw part formed at the other end side of the movable conductor 11 is screwed into a female screw part of a nut member (a member for adjusting a position of the movable electrode; hereinafter called an adjustment nut) which is rotatably supported by the bearing portion 15, could also be employed.

By moving the movable conductor 11 in the axial direction and inserting and extracting the movable electrode 10 into and from the fixed electrode 9 (inserting and extracting the movable electrode 10 into and from the fixed electrode 9 so that the respective electrode members of the both electrodes 9, 10 alternate with each other), an area between facing electrodes (an overlap area between the fixed electrode 9 and the movable electrode 10) changes. With this, when voltage of the opposite polarity is applied to the both electrodes 9, 10 respectively and the area between facing electrodes changes, a value of capacitance appearing between the both electrodes 9, 10 is seamlessly changed, then the impedance adjustment is made.

Regarding high frequency current for the high-frequency apparatus of a case using such vacuum capacitor, the high frequency current flows from the movable side flange 7 to the fixed side flange 8 through the bellows 14 and the capacitance between the facing electrodes. Nowadays, a load used in the high-frequency apparatus becomes large, and the high frequency current increases with increase of the load. Thus the frequency with which frequent adjustment of the flow of the large current is performed has been high.

As one of characteristics required of such vacuum capacitor, it is to maintain a withstand voltage characteristic while maintaining the vacuum state of the vacuum chamber 18. On the other hand, for instance, as mentioned above, when current is applied to the movable electrode 10 and the fixed electrode 9, metal particles (suspended particles) and gas etc. appear in the vacuum chamber 18, and this might cause reduction of degree of vacuum of the vacuum chamber 18, and there arises a problem that the vacuum state cannot be maintained. Further, for instance, because trace molecules of hydrogen etc. have properties such that they permeate through material, there is a problem that the vacuum cannot be maintained for an indefinite term.

Therefore, a method in which a getter 16 is set in the vacuum chamber 18 and an adsorbed object (that is able to be adsorbed by the getter) such as the metal particles and the gas in the vacuum casing 1 is adsorbed by the getter 16, has been employed. As that example, a method using such an evaporation type getter (a dispersion getter) that a getter constituent is evaporated by the heating is known. The method is the following; the evaporated getter constituent adheres to an inner wall of the vacuum casing 1, and the adsorbed object in the vacuum chamber 18 is adsorbed by the adherent constituent. Or a method using a non-evaporation type getter (a junction getter; e.g., a getter made of substances such as magnesium, barium and aluminum that are apt to combine with gases) whose surface is protected by an oxide film is known. The method is the following; the oxide film is removed by the heating and the surface is activated, then the adsorbed object is adsorbed. Furthermore, a manner simultaneously employing the above both methods is known too.

In a case where the above getter 16 is merely set on a surface of the inner wall (e.g. an inner wall of the metal cylinder 6) in the vacuum casing 1, an adsorption effect becomes inadequate and the vacuum chamber 18 cannot be maintained at a high vacuum state, and this brings about a problem that causes an unstable withstand voltage characteristic. Considering this problem, recently, a method that sets the getter 16 on a surface of an inner wall of the fixed side flange 8 (inside the vacuum casing 1) around a center axis of the fixed electrode 9 or on a surface of the movable electrode supporting member 12 around a center axis of the movable electrode 10, has been employed (Patent Document 2).

However, in the vacuum capacitor used for the high-frequency power supply of the semiconductor manufacturing system and the oscillation circuit of a large power oscillator etc., when each electrode is supplied with electric charge, electric field appears around the electrodes and movable electrode supporting member. Because of this, in the case of the conventional method that merely sets the getter on the surface around the center axis of the movable electrode or the fixed electrode, there is a risk that voltage will be applied to the getter by the electric field (especially when such electric field distribution that the getter is a positive electrode side appears).

As described above, when the getter is affected by the electric field, a condition in which electrons reach the getter occurs, then, for example, kinetic energy of the electron is converted into thermal energy, a temperature of the getter therefore rises and reaches a re-release temperature, or electron stimulus (or impulse) occurs (transition of an electronic state occurs). For this reason, there is a possibility that the getter will be deteriorated (life of the getter will be shortened) and a desorption phenomenon of the adsorbed substance will occur.

As explained above, when the adsorbed substance, which has been adsorbed once by the getter, is re-released from the getter by the influence of the electric field, the degree of vacuum of the vacuum chamber is lowered, and the withstand voltage characteristic deteriorates.

The present invention is made for solving these problems, and an object of the present invention is to prevent the reduction of the degree of vacuum of the vacuum chamber and to maintain a desired withstand voltage characteristic, in the vacuum capacitor used for the high-frequency power supply circuit of the semiconductor manufacturing system and the oscillation circuit of the large power oscillator etc., in consideration of the electric field appearing when the current is applied to the vacuum capacitor.

Patent Document 1: Japanese Patent No. JP3264005 (paragraphs [0031]~[0036], FIG. 1)

Patent Document 2: Japanese Patent Application Publication No. JP6-196363 (paragraphs [0016]~[0023], FIG. 1)

DISCLOSURE OF THE INVENTION

According to one aspect of the present invention, a vacuum capacitor, has a vacuum casing which is formed by closing both ends of a tubular insulation member with conductive members and is provided with a vacuum chamber, and forms capacitance between the both conductive members in the vacuum chamber, the vacuum capacitor is characterized in that at least one of the conductive members has a hollow storage portion that is formed at the conductive member and a communication hole through which the storage portion and the vacuum chamber communicate with each other, and a getter is set inside the storage portion.

According to another aspect of the present invention, a fixed electrode is provided at one of the conductive members in the vacuum casing, a movable electrode is provided at the other of the conductive members to be positioned so as to face the fixed electrode and to form the capacitance between the fixed electrode and the movable electrode, and by moving the movable electrode and changing a position of the movable electrode with respect to the fixed electrode, the capacitance can be varied.

According to a further aspect of the invention, one electrode is provided at one of the conductive members in the vacuum casing, and the other electrode is provided at the other of the conductive members in the vacuum casing to be positioned so as to face the one electrode provided at one of the conductive members and to form the capacitance between the electrodes.

According to a still further aspect of the invention, a protruding portion is formed around the communication hole at a vacuum chamber side.

According to a still further aspect of the invention, a gap portion through which the communication hole and the vacuum chamber communicate with each other is formed between the conductive member having the communication hole and the electrode provided at the communication hole.

In view of the foregoing, as compared with the getter placed at the conventional position (for example, on the surface of the fixed side flange around the center axis of the fixed electrode, or on the surface of the movable electrode supporting member around the center axis of the movable electrode), the getter set in the storage portion formed at at least the one conductive member is placed in a position where the electric field distribution is weak. Thus the application of the electric field to the getter can be prevented.

Furthermore, the protruding portion serves as electrostatic shielding (electric field cancelling), and this contributes towards moderating electric field concentration of the getter.

In addition, the electrode serves as electrostatic shielding (electric field cancelling), and this contributes towards moderating the electric field concentration of the getter.

BEST MODE FOR CARRYING OUT THE INVENTION

Figure 6:
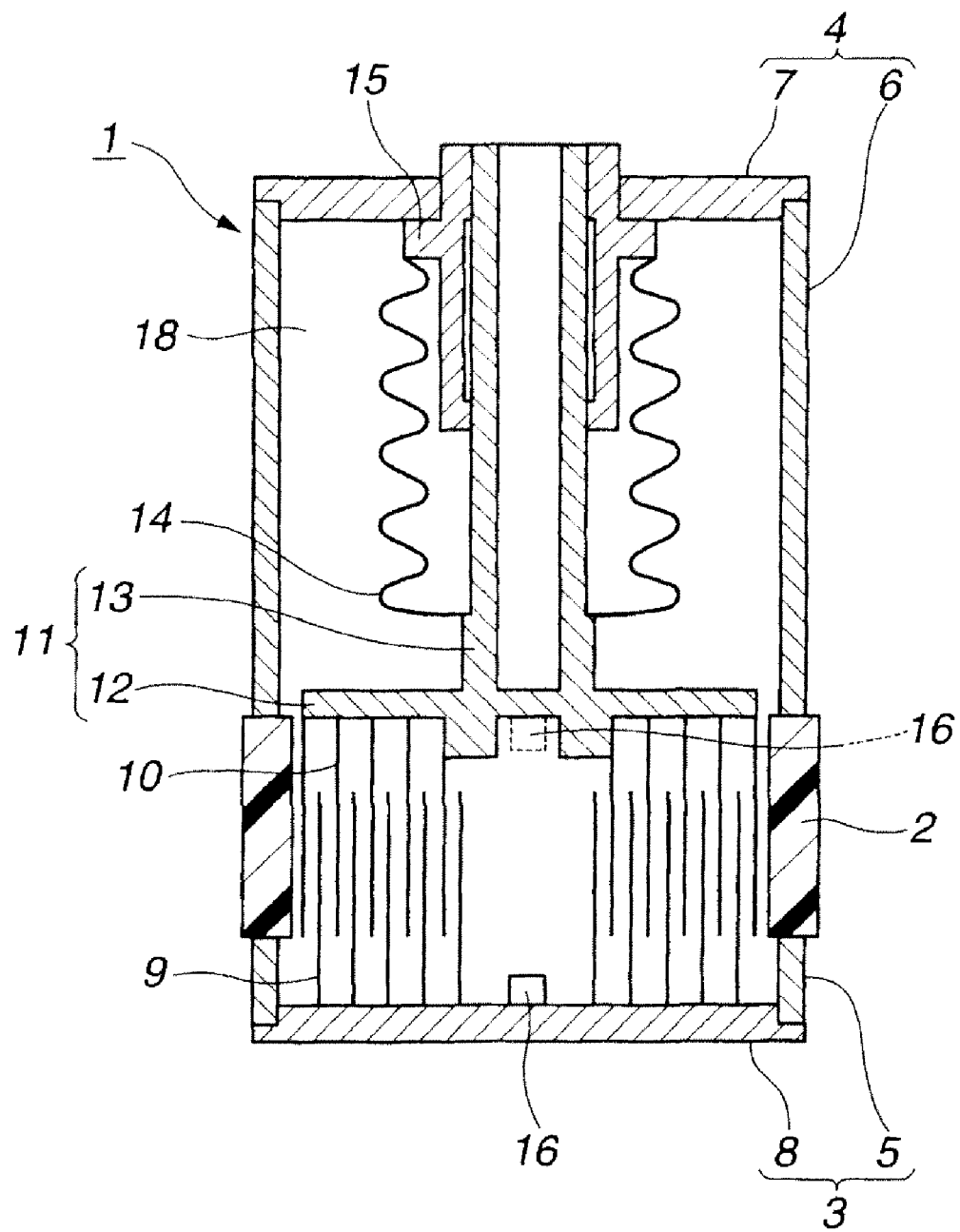
FIG. 6 is a schematic view for explaining an example of a conventional variable vacuum capacitor.

In the following, a vacuum capacitor according to the present invention will be explained on the basis of embodiments 1~3 etc. Here, the same component or element as that in FIG. 6 is denoted by the same reference number, and its detailed explanation will be omitted.

The present embodiment is a vacuum capacitor which has a vacuum casing that is formed by closing both ends of a tubular insulation member with respective conductive members and forms capacitance between the both conductive members in the vacuum casing. And a getter is provided in a position that is unaffected by the electric field (or a position where the influence of the electric field is small) at the one conductive member, and the adsorbed object such as the metal particles (suspended particles) and the gas in a vacuum chamber is adsorbed by the getter. With this, long life of the getter can be achieved, and the degree of vacuum of the vacuum chamber can be maintained.

For example, in the conventional vacuum capacitor, in order to merely improve an adsorption efficiency of the getter, the getter is placed on the surface of the fixed side flange around the center axis of the fixed electrode or on the surface of the movable electrode supporting member around the center axis of the movable electrode. In contrast to this, in the present embodiment, considering the achievement of the long life of the getter etc., the getter is set at an inner side (e.g. in an after-mentioned storage portion) of at least one of two conductive members that form the vacuum casing. As mentioned above, the getter set at the inner side of the conductive member adsorbs the adsorbed object such as the metal particles and the gas, which appears the vacuum chamber, through a hole (a communication hole) that is formed in the conductive member and communicates with the vacuum chamber.

In the present embodiment, the application of the electric field to the getter is prevented. Therefore, even though the electric field appears in the vacuum casing, the temperature of the getter does not reach the re-release temperature, and also electron stimulus (or impulse) desorption phenomenon does not occur, then it is possible to prevent the metal particles and the gas etc. which have been adsorbed once by the getter from being released. As a consequence, the high vacuum state of the vacuum chamber can be maintained, and the withstand voltage characteristic of the vacuum capacitor can be maintained.

[Embodiment 1]

Figure 1:
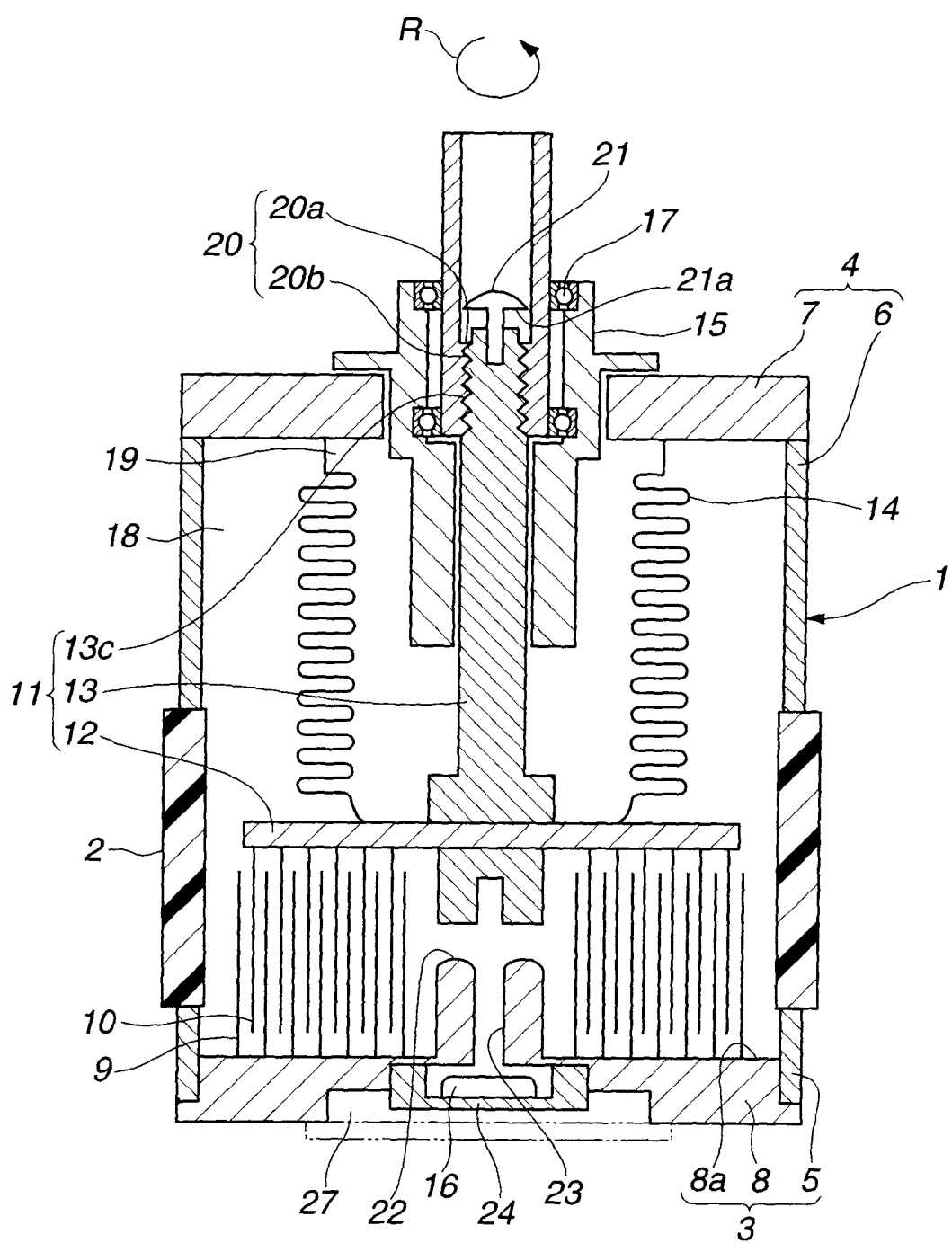
FIG. 1 is a schematic view for explaining an example of a variable vacuum capacitor according to an embodiment 1 of the present invention.
Figure 2:
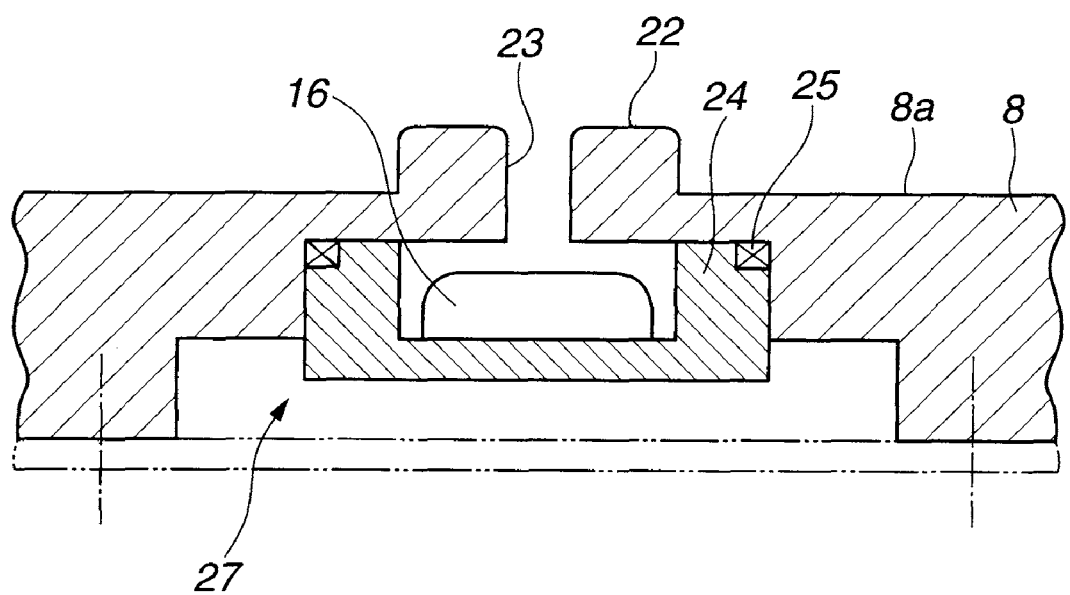
FIG. 2 is an enlarged view of a fixed side flange according to the embodiment 1 of the present invention.

FIG. 1 (general view for explanation) and FIG. 2 (enlarged view of a fixed side flange) are schematic views for explaining an example of a (variable) vacuum capacitor according to the present embodiment. The (variable) vacuum capacitor is formed mainly from an insulation tube (an insulation member; e.g. a member made of insulation material such as ceramic material) 2 and conductive members (e.g. members made of metal such as copper) 3, 4 which are provided to close the one end side and the other end side of the insulation tube 2, same as FIG. 6. The conductive members 3, 4 are respectively formed from metal cylinders 5, 6, which are provided on the one end side and the other end side of the insulation tube 2, and a movable side flange 7 and a fixed side flange 8, which are provided to close the insulation tube 2 and the metal cylinders 5, 6 and used also as external terminals.

In a vacuum casing 1, a fixed electrode 9 that is formed from a plurality of cylindrical electrode members whose inside diameters are different from each other, is provided on an inner side of the fixed side flange 8 (inside the vacuum casing 1). And, same as the fixed electrode 9, a movable electrode 10 that is formed from a plurality of cylindrical electrode members which are provided concentrically at a certain distance and whose inside diameters are different from each other, is provided. The movable electrode 10 is set so that the movable electrode 10 can be inserted into and extracted from the fixed electrode 9 (the each electrode member of the movable electrode 10 can be inserted into and extracted from a gap between the electrode members of the fixed electrode 9 then the electrode members of the both movable and fixed electrodes 10, 9 alternate with each other) with the each electrode member of the movable electrode 10 in a noncontact with the electrode members of the fixed electrode 9.

The movable electrode 10 is an electrode that can move in an axial direction of the vacuum casing 1. The movable electrode 10 is supported by a movable conductor 11 that is formed from a movable electrode supporting member 12 which supports the movable electrode 10 and a movable rod 13 which protrudes from a back surface (a surface on which the movable electrode 10 is not secured) of the movable electrode supporting member 12 to an outward direction of the vacuum casing 1 (in a direction of the movable side flange 7). The movable rod 13 has a male screw part (which can be screwed into an after-mentioned insulation control member) 13c at one end side of the movable side flange 7. And the movable rod 13 is inserted into a bearing portion (in the drawing, a supporting member having a thrust bearing 17 for reducing a rotation torque from an outside of the vacuum casing 1) 15 which is provided in the vacuum casing 1 (in the drawing, the bearing portion 15 is secured so that the bearing portion 15 penetrates the movable side flange 7).

In addition, a vacuum chamber 18 is defined on a movable electrode 10 side and a fixed electrode 9 side by bellows (in the drawing, bellows connected between the movable side flange 7 and the movable side supporting plate 12 (for instance, through vacuum high temperature brazing)) 14, and an atmospheric chamber 19 is defined on a movable conductor 11 side. As the bellows 14, material having durability (mechanical strength etc.) and conductivity is used. For instance, it is the one that is made of phosphor bronze or a copper-clad SUS member.

A reference sign 20 is a tubular member (hereinafter called the insulation control member) which moves the movable rod 13 in the axial direction of the vacuum casing 1 and adjusts the capacitance of the vacuum capacitor. The insulation control member 20 is rotatably supported on one end side of the bearing portion 15 (in the drawing, on a thrust bearing 17 side). At a middle portion inside the insulation control member 20, a stepped part 20a is formed. And at one end side of the stepped part 20a, a small-diameter (smaller than the other end side) female screw part 20b is formed. The male screw part 13c of the movable rod 13 screws into the female screw part 20b. On the other end side, a drive source (e.g. a motor, not shown) of the vacuum capacitor is connected (for instance, via an insulation means).

By rotating the insulation control member 20 (for example, in a rotation direction of an arrow R in the drawing) by means of the drive source, the movable conductor 11 moves in the axial direction while rotating in accordance with a shape of the female screw part 20b, and an area between facing electrodes (an overlap area between the fixed electrode 9 and the movable electrode 10) changes. As can be seen in the drawing, since a conductive body of the movable rod 13 is inserted into the bearing portion 15, wobble of the movable conductor 11 can be suppressed upon the movement of the movable conductor 11. Further, for instance, by attaching a stopper screw (a screw having a seat 21a whose inside diameter is greater than the female screw part 20b) 21 to the movable conductor 11, a movable range of the movable conductor 11 can be limited (for instance, contact between the facing electrodes can be prevented).

In the fixed side flange 8 of the embodiment 1, a hollow storage portion 27 for storing a getter 16 is formed. This storage portion 27 communicates with the vacuum chamber 18 through a communication hole 23 that penetrates a vacuum chamber 18 inner side surface (hereinafter called a fixed side flange inner side surface) 8a of the fixed side flange 8 (in the drawing, the communication hole 23 is provided in the middle of the fixed side flange inner side surface 8a) so as to be able to adsorb the adsorbed object in the vacuum chamber 18 by the getter 16 set inside the storage portion 27.

In the case of the communication hole 23 in the drawing, a ring-shaped protruding portion 22, which protrudes from the middle of the fixed side flange inner side surface 8a towards the inside of the vacuum chamber 18, is formed around the communication hole 23 (so that the adsorbed object passes through the communication hole 23).

With respect to the getter 16, for instance, as shown in the drawing, the getter 16 is placed in a cylindrical member (a recessed member) having a bottom (hereinafter called a bottomed cylindrical shaped member) 24. The getter 16 is stored from an opening side of the storage portion 27. The bottomed cylindrical shaped member 24 is fixed to an inner wall side of the storage portion 27 so that an opening side of the bottomed cylindrical shaped member 24 and the vacuum chamber 18 communicate with each other through the communication hole 23. Here, a closing plate (e.g. such a closing plate as shown by a virtual line) could be attached to the fixed side flange 8, as necessary, for closing the opening side of the storage portion 27.

As described above, the getter 16 placed in the storage portion 27 formed in the conductive member (in the present embodiment, the fixed side flange 8) is activated by, for example, the current heating, and adsorbs the adsorbed object such as the metal particles and the gas which appears when the current is applied to the movable electrode 10 and the fixed electrode 9.

In the case of this arrangement in which the getter 16 is placed in the storage portion 27 as explained above, the arrangement is so done as to be able to adsorb the adsorbed object in the vacuum chamber 18 by the getter 16 and to prevent the outside air from getting into the vacuum chamber 18 via the storage portion. For instance, a vacuum state of the vacuum chamber 18 in FIG. 1 is secured by the attachment of the bottomed cylindrical shaped member 24 to the fixed side flange 8. More specifically, by fixing the bottomed cylindrical shaped member 24 to the fixed side flange 8 through the brazing etc., the vacuum state is secured. A brazing position is not specially limited as long as the adsorption of the adsorbed object and the vacuum state can be secured. As an example, the brazing position is an opening edge (an maximum inside diameter part) of the bottomed cylindrical shaped member 24. Further, in the case where the closing plate is provided at the opening side of the storage portion 27, in order to improve the reliability of the securing of the vacuum state, for instance, a sealing structure in which a sealing member is provided at an attachment position of the closing plate could be employed.

According to the configuration of the embodiment 1, as compared with the conventional art in which the getter 16 is placed on the wall surface of the fixed side flange 8 (the inner side surface of the vacuum casing 1) around the center axis of the fixed electrode 9 or on the surface of the movable electrode supporting member 12 around the center axis of the movable electrode 10, the getter 16 is placed in the position where the electric field distribution is weak (i.e. in the conductive member). Further, the protruding portion 22 formed at the fixed side flange 8 serves as the electrostatic shielding (the electric field cancelling), and this contributes towards moderating electric field concentration of the getter 16. In addition, the configuration has such advantage in the arrangement of the getter 16 that interference (contact) with each member such as the electrode in the vacuum chamber 18 can be prevented (or the setting of the getter 16 is easy).

Figure 3:
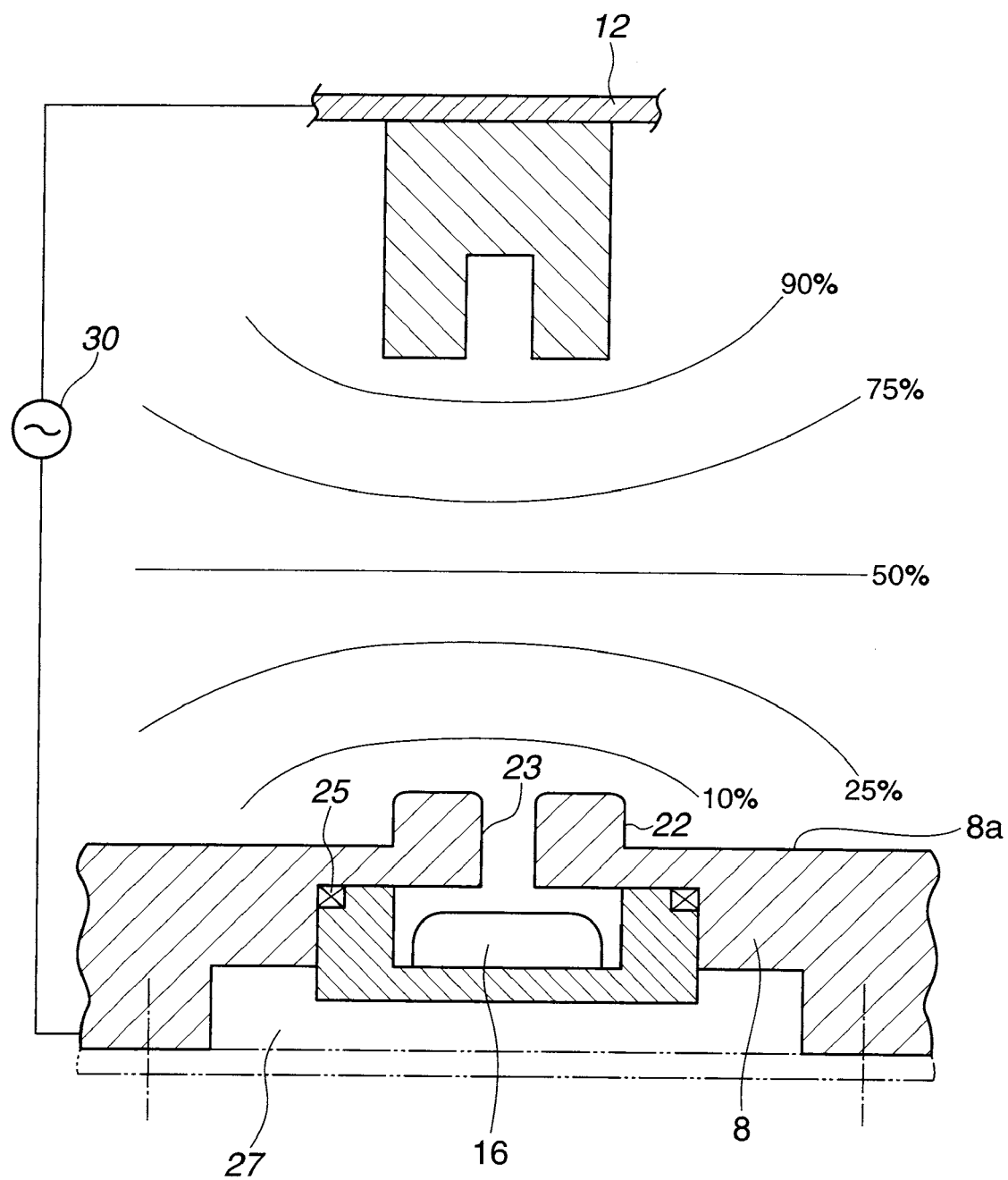
FIG. 3 is an electric field distribution profile in the vacuum capacitor.

Here, as the electric field that can appear in the configuration shown in FIGS. 1 and 2, for instance, it is such an electric field distribution profile as shown in FIG. 3. As seen in FIG. 3, when applying the current by an AC power supply 30, electric field E appears between the movable electrode 10 and the fixed electrode 9. With regard to the distribution profile of the electric field E, as a position in the electric field E becomes closer to the fixed electrode 9 from the movable electrode 10, the electric field E becomes weaker. That is to say, when arranging the getter 16 at the fixed side flange 8 where the electric field E is weak, as compared with the arrangement of the getter 16 at the movable side flange 7, an ill effect to the getter 16 by the electric field E (e.g. re-release of the adsorbed object by the influence of the electric field) becomes small.

As explained in the embodiment 1, by arranging the getter 16 in the place where the electric field is weak at at least one of the two conductive members that form the vacuum casing (in the case of the configuration shown in FIGS. 1 and 2, preferably, at the fixed side flange 8), even though the electric field appears upon the operation of the vacuum capacitor, the long life of the getter 16 can be achieved. Also it is possible to prevent the adsorbed object, which has been adsorbed once by the getter 16, from being re-released by the influence of the electric field. As a consequence, it is possible that the degree of vacuum of the vacuum chamber 18 is improved (e.g. the degree of vacuum is maintained at the degree of vacuum when manufactured), then this provides improvement in the withstand voltage characteristic of the vacuum capacitor (e.g. the desired withstand voltage when manufactured can be maintained).

Here, although the communication hole 23 and the storage portion 27 in FIGS. 1~3 are formed at the middle of the fixed side flange 8, they could be formed at a position away from the middle of the fixed side flange 8. For example, they could be arranged in a position where the electric field appearing around the electrode and the movable electrode supporting member does not affect the getter 16 and also the getter 16 can adsorb the adsorbed object in the vacuum chamber 18. As long as the communication hole 23 and the storage portion 27 are formed in such a position, it is clear that the same working and effects as the FIGS. 1~3 can be obtained.

[Embodiment 2]

Figure 4:
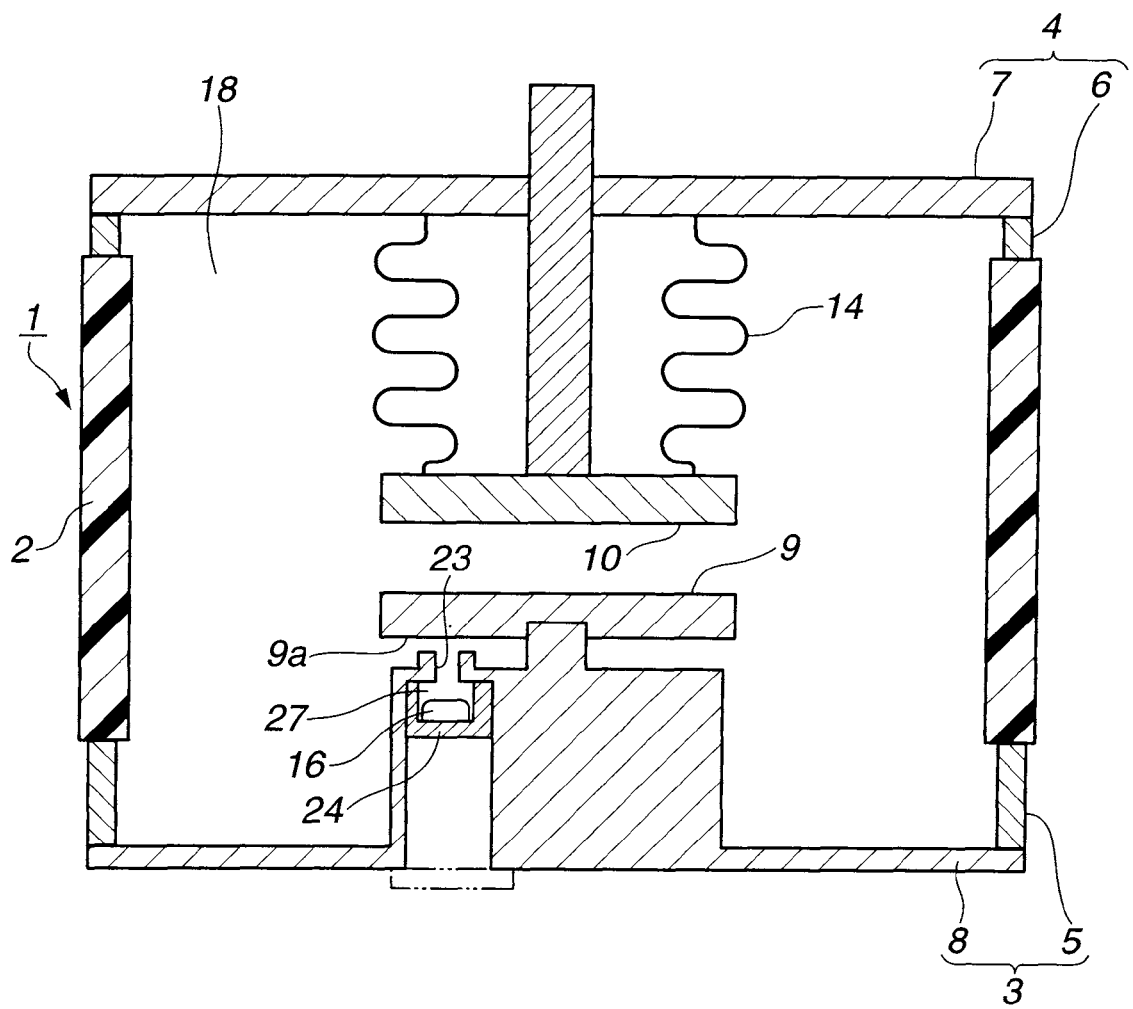
FIG. 4 is a schematic view for explaining another example of the variable vacuum capacitor according to an embodiment 2 of the present invention.

FIG. 4 is a schematic view for explaining another example of the (variable) vacuum capacitor according to the present embodiment. The (variable) vacuum capacitor is formed mainly from a vacuum casing 1 that has an insulation tube (an insulation member; e.g. a tubular insulation member made of insulation material such as ceramic material) 2 and conductive members (e.g. members made of metal such as copper) 3, 4 which are provided at one end side and the other end side of the insulation tube 2, same as the embodiment 1. The fixed side conductive member 3 and the movable side conductive member 4 are respectively formed from metal cylinders 5, 6, which are provided on the one end side and the other end side of the insulation tube 2, and a fixed side flange 8 and a movable side flange 7, which are provided to close the insulation tube 2 and the metal cylinders 5, 6 and used also as external terminals.

In the vacuum casing 1, a pair of a fixed electrode 9 and a movable electrode 10 are disposed. A movable conductor 11 protrudes from a back surface of the movable electrode 10 to an outward direction of the vacuum casing 1 (in a direction of the movable side flange 7) (in the drawing, the movable conductor 11 protrudes in an axial direction of the vacuum casing 1). Further, between the movable conductor 11 (or the movable electrode 10) and the movable side flange 7, bellows 14 for keeping airtight (vacuum) of the vacuum casing 1 and moving the movable conductor 11 are provided. For example, by moving the movable electrode 10 (or the movable conductor 11) in the axial direction and changing a position of the movable electrode 10 with respect to the fixed electrode 9, a distance between the facing electrodes is varied, then the capacitance is adjusted and the impedance adjustment is made.

In the fixed side flange 8 of the embodiment 2, same as the embodiment 1, a hollow storage portion 27 for storing a getter 16, a bottomed cylindrical shaped member 24 fixed to an inner wall side of the storage portion 27, a communication hole 23 provided at the storage portion 27, and a closing plate for closing an opening side of the storage portion 27, are formed. The fixed electrode 9 is provided at the fixed side flange 8 so that a gap portion 9a is formed between the fixed electrode 9 and the communication hole 23 (in order for the adsorbed object to be able to pass through the communication hole 23) and a vacuum chamber 18 and the communication hole 23 can communicate with each other through the gap portion 9a. That is, the communication hole 23 is overlaid with the fixed electrode 9 through the gap portion 9a.

Hence, the fixed electrode 9 serves as the electrostatic shielding (the electric field cancelling) of the getter 16, and this contributes towards moderating electric field concentration of the getter 16. In view of the foregoing, as compared with the embodiment 1, the getter 16 is placed in a position where the electric field distribution is weaker than that in the embodiment 1.

As explained in the embodiment 2, by arranging the getter 16 in the place where the electric field is weak at at least one of the two conductive members that form the vacuum casing, even though the electric field appears upon the operation of the vacuum capacitor, the long life of the getter 16 can be achieved. And the same working and effects as the embodiment 1 or more can be obtained.

Here, although the communication hole 23 and the storage portion 27 in FIG. 4 are formed at a position away from the middle of the fixed side flange 8, they could be formed at the middle of the fixed side flange 8. For example, they could be arranged in a position where the electric field appearing around the electrode and the movable electrode supporting member does not affect the getter 16 and also the getter 16 can adsorb the adsorbed object in the vacuum chamber 18. As long as the communication hole 23 and the storage portion 27 are formed in such a position, it is clear that the same working and effects as the FIG. 4 can be obtained.

[Embodiment 3]

Figure 5:
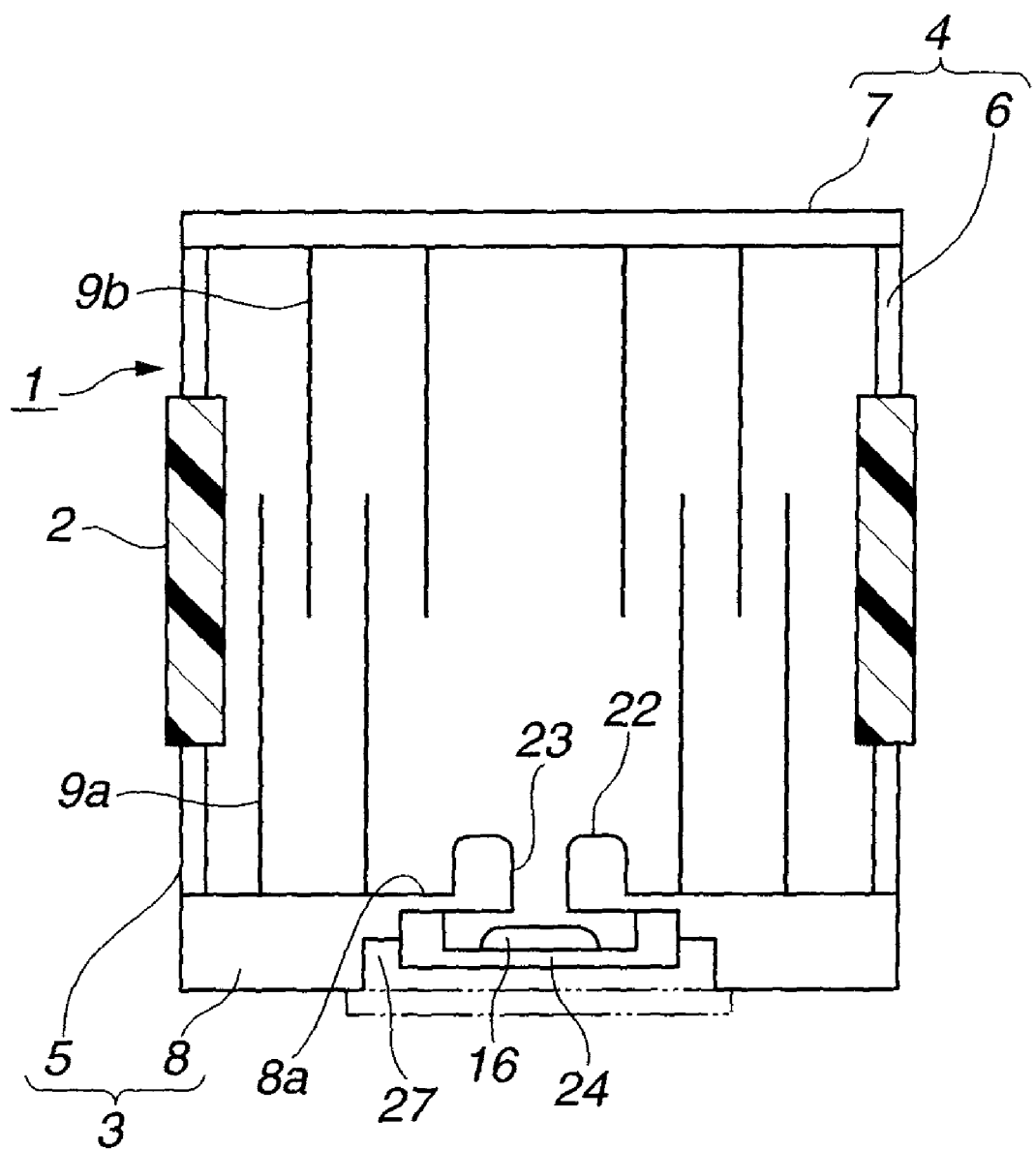
FIG. 5 is a schematic view for explaining an example of a fixed type vacuum capacitor according to an embodiment 3 of the present invention.

FIG. 5 is a schematic view for explaining an example of a (fixed type) vacuum capacitor according to the present embodiment. The (fixed type) vacuum capacitor is formed mainly from a vacuum casing 1 that has an insulation tube (an insulation member; e.g. a tubular insulation member made of insulation material such as ceramic material) 2 and conductive members (e.g. members made of metal such as copper) 3, 4 which are provided at one end side and the other end side of the insulation tube 2, same as the embodiments 1, 2. The conductive members 3, 4 are respectively formed from metal cylinders 5, 6, which are provided on the one end side and the other end side of the insulation tube 2, and flanges 7, 8, which are provided to close the insulation tube 2 and the metal cylinders 5, 6 and used also as external terminals.

One fixed electrode 9a that is formed from a plurality of cylindrical electrode members which are provided concentrically at a certain distance and whose inside diameters are different from each other, is fixed to an inner side of the one flange 8 (an inner side of the vacuum casing 1). In addition, the other fixed electrode 9b that is formed from a plurality of cylindrical electrode members which are provided concentrically at a certain distance and whose inside diameters are different from each other, is fixed to the other flange 7 so that the other fixed electrode 9b can be inserted into and extracted from a gap of the one fixed electrode 9a with the other fixed electrode 9b in a noncontact with the one fixed electrode 9a.

In the one flange 8 of the embodiment 3, same as the embodiment 1, a hollow storage portion 27 for storing a getter 16, a bottomed cylindrical shaped member 24 fixed to an inner wall side of the storage portion 27, a communication hole 23 through which a vacuum chamber 18 and the storage portion 27 communicate with each other, a ring-shaped protruding portion 22 which is formed around the communication hole 23 and protrudes from the middle of the one flange 8 towards the inside of the vacuum chamber 18, and a closing plate for closing an opening side of the storage portion 27, are formed.

That is, same as the embodiment 1, the getter 16 is placed in the position where the electric field distribution is weak. Further, the protruding portion 22 formed at the one flange 8 serves as the electrostatic shielding (the electric field cancelling), and this contributes towards moderating electric field concentration of the getter 16.

As explained in the embodiment 3, by arranging the getter 16 in the place where the electric field is weak at at least one of the two conductive members that form the vacuum casing, even though the electric field appears upon the operation of the vacuum capacitor, the long life of the getter 16 can be achieved. And the same working and effects as the embodiments 1, 2 can be obtained.

Here, in the configuration of the vacuum capacitor in FIG. 5, even if the fixed electrodes 9a, 9b are eliminated, for example, in a case where two facing protruding portions 22 are formed at the one flange 8 and the other flange 7 respectively so that the protruding portions 22 protrude in a direction in which the two facing protruding portions 22 come close to each other and then the capacitance appears by the application of the current to the protruding portions 22, the respective protruding portions 22 function as the fixed electrodes 9a, 9b. And this can obtain the same working and effects as the embodiments 1, 2.

Although the invention has been described above by reference to certain embodiments of the invention, the invention is not limited to the embodiments described above. Modifications and variations of the embodiments described above will occur to those skilled in the art in light of the above teachings. As a matter of course, these modifications and variations are included in claims.

For example, as long as the getter 16 is placed in the storage portion 27 formed at at least the one conductive member, namely, that as long as the getter 16 is placed in the position that is unaffected by the electric field (or the position where the influence of the electric field is small) in the vacuum capacitor, different shapes of the storage portion 27, the protruding portions 22, the bottomed cylindrical shaped member, the closing plate, an airtight means 25, and the communication hole 23 etc. could be employed and also each of them might be properly eliminated. Also in this case, it is clear that the same working and effects as the embodiments 1, 2 and 3 can be obtained.

Furthermore, although specific shaped vacuum capacitor has been explained in the embodiments, different shapes of the fixed electrode, the movable electrode, the movable conductor and the bellows etc. could be employed and also each of them might be properly eliminated. Also in this case, it is clear that the same working and effects as the embodiments 1, 2 and 3 can be obtained.

The invention claimed is:

1. A vacuum capacitor comprising:
a vacuum casing which is formed by closing both ends of a tubular insulation member with conductive members and is provided with a vacuum chamber, the vacuum casing forming capacitance between both conductive members in the vacuum chamber;
a storage portion that is formed at at least one of the conductive members;
a communication hole through which the storage portion and the vacuum chamber communicate with each other;
an electrostatic shielding portion that is formed around the communication hole so as to encircle the communication hole; and
a getter that is set inside the storage portion.

2. The vacuum capacitor as claimed in claim 1, wherein:
a fixed electrode is provided at one of the conductive members in the vacuum casing, a movable electrode is provided at the other of the conductive members to be positioned so as to face the fixed electrode and to form the capacitance between the fixed electrode and the movable electrode, and
by moving the movable electrode and changing a position of the movable electrode with respect to the fixed electrode, the capacitance can be varied.

3. The vacuum capacitor as claimed in claim 1, wherein:
one electrode is provided at one of the conductive members in the vacuum casing, and the other electrode is provided at the other of the conductive members in the vacuum casing to be positioned so as to face the one electrode provided at one of the conductive members and to form the capacitance between the electrodes.

4. The vacuum capacitor as claimed in claim 1, wherein:
the electrostatic shielding portion protrudes towards an inside of the vacuum chamber.

5. The vacuum capacitor as claimed in claim 2, wherein:
a gap portion through which the communication hole and the vacuum chamber communicate with each other is formed between the conductive member having the communication hole and the electrode provided at the communication hole.

6. A vacuum capacitor comprising:
a vacuum casing which is formed by closing both ends of a tubular insulation member with conductive members and is provided with a vacuum chamber, the vacuum casing forming capacitance between the both conductive members in the vacuum chamber;
a storage portion that is formed at at least one of the conductive members;
a communication hole through which the storage portion and the vacuum chamber communicate with each other;
an electrostatic shielding portion that is formed around the communication hole; and
a getter that is set inside the storage portion,
wherein the electrostatic shielding portion protrudes towards an inside of the vacuum chamber.

* * * * *